US010075398B2

(12) United States Patent
Ballard et al.

(10) Patent No.: US 10,075,398 B2
(45) Date of Patent: Sep. 11, 2018

(54) SYSTEMS AND METHODS FOR ENABLING A HOST SYSTEM TO USE A NETWORK INTERFACE OF A MANAGEMENT CONTROLLER

(71) Applicant: Dell Products L.P., Round Rock, TX (US)

(72) Inventors: Lee E. Ballard, Georgetown, TX (US); Elie Antoun Jreij, Pflugerville, TX (US); Balasubramanian Nagaiah, Round Rock, TX (US); Shyamkumar T. Iyer, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 169 days.

(21) Appl. No.: 14/757,625

(22) Filed: Dec. 23, 2015

(65) Prior Publication Data
US 2017/0187633 A1    Jun. 29, 2017

(51) Int. Cl.
*H04L 12/931* (2013.01)
*H04L 12/66* (2006.01)
*H04L 12/26* (2006.01)

(52) U.S. Cl.
CPC .............. *H04L 49/70* (2013.01); *H04L 12/66* (2013.01); *H04L 43/0876* (2013.01)

(58) Field of Classification Search
None
See application file for complete search history.

(56) References Cited

U.S. PATENT DOCUMENTS

| 2007/0226377 A1* | 9/2007 | Jreij | G06F 13/385 710/8 |
| 2009/0100194 A1* | 4/2009 | Bhadri | G06F 13/105 709/244 |
| 2010/0005190 A1* | 1/2010 | Shah | H04L 41/00 709/235 |
| 2014/0222945 A1* | 8/2014 | Noronha | G06F 12/02 709/212 |

* cited by examiner

*Primary Examiner* — Nicholas Sloms
(74) *Attorney, Agent, or Firm* — Jackson Walker LLP; Brian K. Prewitt; Thomas B. Hayes

(57) ABSTRACT

In accordance with embodiments of the present disclosure, an information handling system comprising may include a host system processor and a management controller communicatively coupled to the host system processor and configured to provide management of the information handling system via management traffic communicated between the management controller and a network external to the information handling system. The management controller may be further configured to couple to the external network via a first network interface integral to the management controller, emulate a second network interface to an operating system executing on the host system processor, and bridge the first network interface and the second network interface such that host system traffic may be communicated between the host system processor and the external network via the management controller.

15 Claims, 2 Drawing Sheets

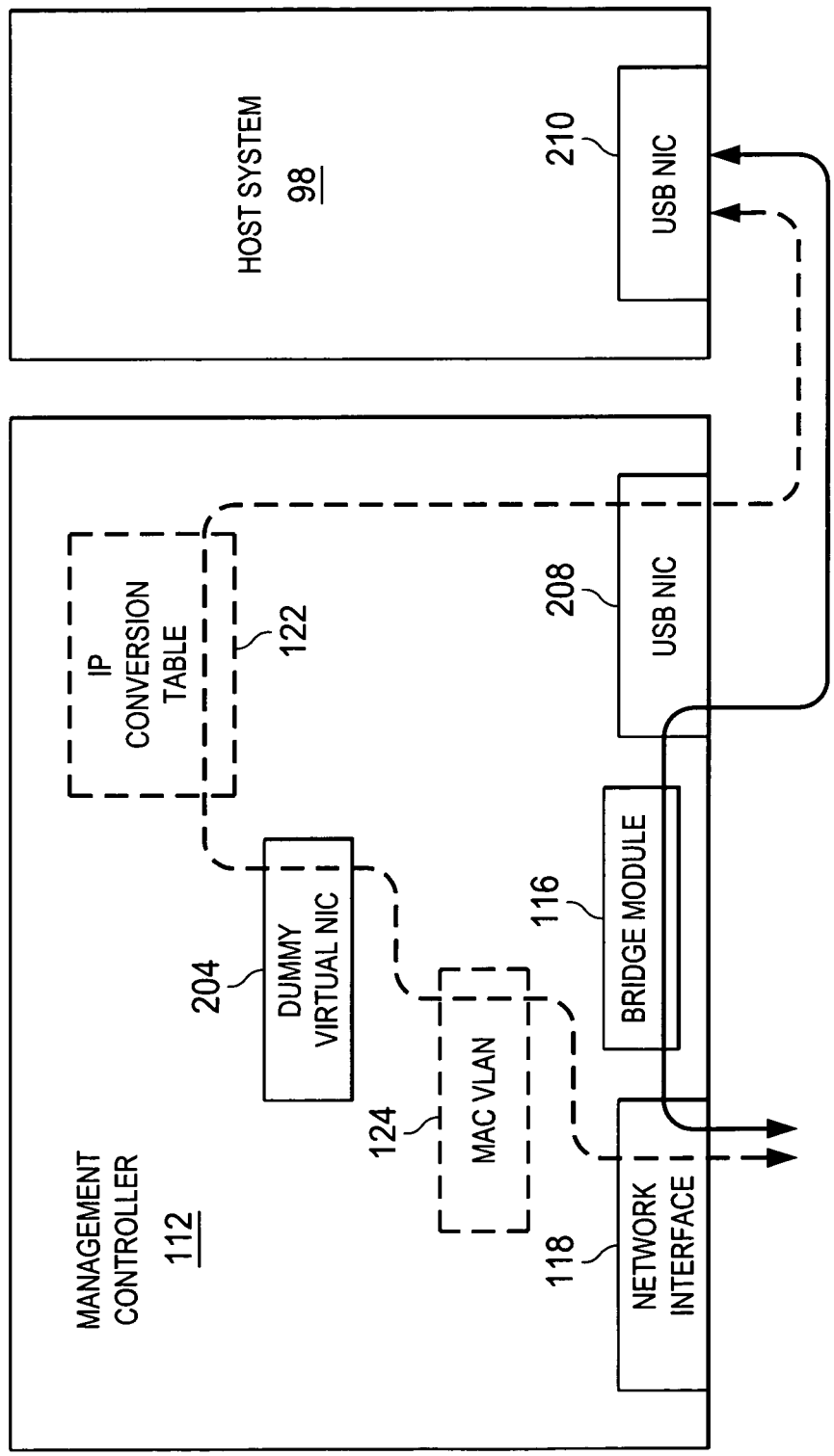

SYSTEMS AND METHODS FOR ENABLING A HOST SYSTEM TO USE A NETWORK INTERFACE OF A MANAGEMENT CONTROLLER

TECHNICAL FIELD

The present disclosure relates in general to information handling systems, and more particularly to methods and systems for implementing a virtual network port for a host system of an information handling system using a management controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may, be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are equipped with 10 gigabit Ethernet host system network interfaces, but oftentimes an end user will desire to use such an information handling system in a 1 gigabit environment having physical interfaces (e.g., incompatible form factors) incompatible with the 10 gigabit host system network interface. Existing solutions to overcome this problem may be costly. For example, one solution is to use expensive converters (e.g., small form-factor pluggable to base-T type converters).

SUMMARY

In accordance with the teachings of the present disclosure, the disadvantages and problems associated with existing approaches to providing network interfaces to an information handling system may be reduced or eliminated.

In accordance with embodiments of the present disclosure, an information handling system comprising may include a host system processor and a management controller communicatively coupled to the host system processor and configured to provide management of the information handling system via management traffic communicated between the management controller and a network external to the information handling system. The management controller may be further configured to couple to the external network via a first network interface integral to the management controller, emulate a second network interface to an operating system executing on the host system processor, and bridge the first network interface and the second network interface such that host system traffic may be communicated between the host system processor and the external network via the management controller.

In accordance with these and other embodiments of the present disclosure, a method may include, in a management controller communicatively coupled to a host system processor and configured to provide management of the information handling system via management traffic communicated between the management controller and a network external to an information handling system housing the management controller and the host system processor: coupling to the external network via a first network interface integral to the management controller; emulating a second network interface to an operating system executing on the host system processor; and bridging the first network interface and the second network interface such that host system traffic may be communicated between the host system processor and the external network via the management controller.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a management controller communicatively coupled to a host system processor and configured to provide management of the information handling system via management traffic communicated between the management controller and a network external to an information handling system housing the management controller and the host system processor: couple to the external network via a first network interface integral to the management controller; emulate a second network interface to an operating system executing on the host system processor; and bridge the first network interface and the second network interface such that host system traffic may be communicated between the host system processor and the external network via the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a block diagram of functional components of the host system and management controller depicted in FIG. 1, in accordance with embodiments of the present disclosure.

DETAILED DESCRIPTION

Figure 1:
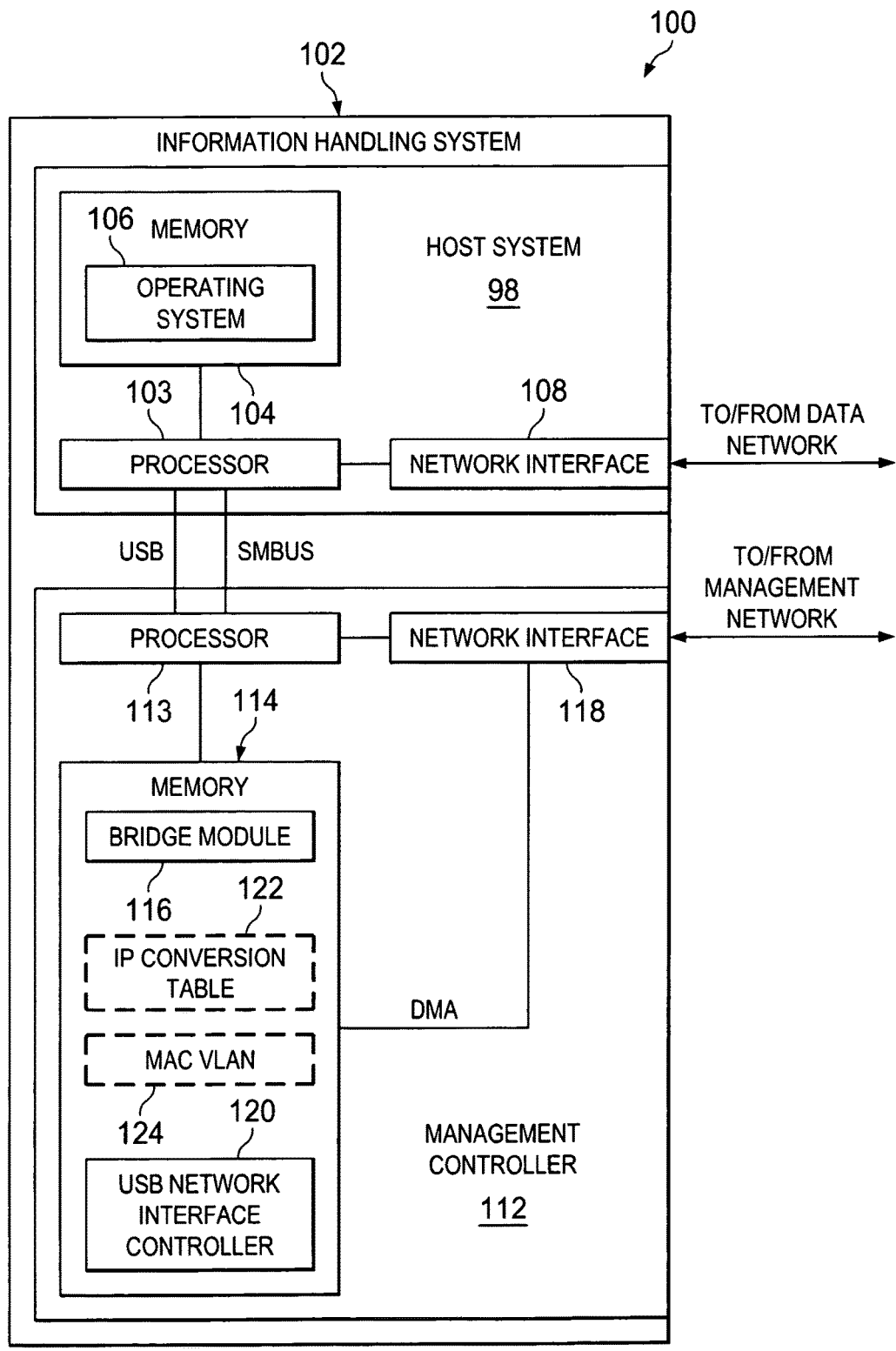
FIG. 1 illustrates a block diagram of an example information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network or USB network interface module 120 for communication over a management network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory 114, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 103 may be communicatively coupled to processor 103 via a Universal Serial Bus (USB), System Management Bus (SMBus), and/or one or more other communications channels. For example, while not shown in FIG. 1, in some embodiments, management controller 112 and processor 103 may communicate via a Peripheral Component Interconnect (PCI) bus, in which management controller 112 may utilize single-root input/output virtualization in order to function as both a Video Graphics Array (VGA) device and a network interface card.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon a bridge module 116 and a USB network interface module 120. In some embodiments, memory 114 may have stored therein an Internet Protocol (IP) conversion table 122 and a Media Access Control Virtual Local Area Network (MAC VLAN) 124 in addition to or in lieu of bridge module 116.

Bridge module 116 may comprise any program of executable instructions, or aggregation of programs of executable instructions, configured to create a bridge (e.g., a Level 2 bridge in a Level 2 layer/data link layer of the Internet Protocol suite or another networking suite) between network interface 118 and USB network interface module 120. In some embodiments, bridge module 116 may be integral to firmware or other software for carrying out the function of management controller 112 (e.g., a Linux kernel bridge driver and associated utilities making up the firmware of management controller 112). Active portions of bridge module 116 may be transferred to memory 114 for execution by processor 113. Although bridge module 116 is shown in FIG. 1 as stored in memory 114, in some embodiments bridge module 116 may be stored in storage media accessible to processor 113, and active portions of bridge module 116 may be transferred from such storage media to memory 114 for execution by processor 113.

USB network interface module 120 may comprise any program of executable instructions, or aggregation of programs of executable instructions, configured to emulate a network interface (e.g., an Ethernet-style network interface) via a Universal Serial Bus (e.g., a Universal Serial Bus communicatively coupling processor 103 to processor 113). For example, in some embodiments, USB network interface module 120 may implement an Ethernet-style over USB emulation protocol such as Remote Network Driver Interface Specification (RNDIS), or one of a Communications Device Class (CDC) group of protocols, such as Ethernet Control Model (ECM), Ethernet Emulation Model (EEM), and Network Control Model (NCM). Accordingly, USB network interface module 120 may emulate an Ethernet-style network interface to operating system 106 executing on host system 98.

MAC VLAN 124 may comprise any program of executable instructions, or aggregation of programs of executable instructions, configured to allows a single physical network interface to be associated with multiple IP addresses and multiple Media Access Control addresses.

IP conversion table 122 may include any suitable data structure for mapping IP addresses to one another so that one or more IP addresses may be translated into respective corresponding IP addresses using Network Address Translation (NAT) or similar approach.

MAC VLAN 124 and IP conversion table 122 are shown in dotted lines in FIG. 1, indicating that they may be used as an alternative to bridge module 116 to enable host system 98 to use network interface 118 of management controller 112.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface. As shown in FIG. 1, network interface 118 may be communicatively coupled to memory 114 via a Direct Memory Access (DMA) bus.

In addition to processor 103, memory 104, network interface 108, and management controller 112, information handling system 102 may include one or more other information handling resources.

FIG. 2 illustrates a block diagram of functional components of the host system 98 and management controller 112 depicted in FIG. 1i in accordance with embodiments of the present disclosure.

As shown in FIG. 2, in operation, USB network interface module 120 may emulate a USB NIC 208 and operating system 106 may emulate a USB NIC 210 for host system 98. Thus, bridge module 116 may implement a bridge between network interface 118 and USB network interface module 120 and thus may enable operating system 106 executing on host system 98 to communicate with an externally-coupled data network via management controller 112 without impacting management traffic of management controller 112. Thus, if network interface 108 is not suitable for coupling to an available network or is not otherwise used for data communication, bridge module 116 may enable a communications path for host system 98 to a network externally coupled via management controller 112.

In some embodiments, bridge module 116 and/or another component of management controller 112 may also monitor network traffic between host system 98 and the network coupled to management controller 112 and control bandwidth, throttle or otherwise control flow between management traffic of management controller 112 and host system 98 network traffic, and/or restrict traffic between host system 98 and the network.

Among the advantages of the methods and systems described above is that USB network interface module 120 to network interface 118 bridging may require lower processor utilization than greater throughput than other solutions as the bridging performed by bridge module 116 may occur early within kernel packet processing (e.g., at Level 2/data link layer of the networking stack). For example, such kernel may not need to check an Ethernet frame check sequence on any packet it receives from USB network interface module 120 unless the destination of such packet is a network address of a component of management controller 112 (e.g., a keyboard-video-mouse over Internet or iKVM device of management controller 112).

Alternatively, instead of using bridge module 116 to enable host system 98 to use network interface 118 of management controller 112 for communication of data, in some embodiments management controller 112 may use MAC VLAN 124, and IP conversion table 122 to enable similar functionality. For incoming network traffic to host system 98, a network packet may include a destination address (e.g., an IP address) of a dummy NIC rather than the IP address for management traffic of management controller 112. Using NAT, the dummy IP address may be converted to an IP address of USB NIC 210 by reference to IP conversion table 122, and thus, such packet may be routed from network interface 118 to USB NIC 210 via USB NIC 208.

Conversely, for outgoing packets, a network packet may include a source address (e.g., an IP address) of USB NIC 210 of host system 98 and may be routed to USB NIC 208, after which, by reference to IP conversion table 206, the source address of the packet may be translated using NAT to an dummy IP address instantiated by MAC VLAN 124 and as a result, routed to network interface 118 through MAC VLAN 202, after which it may be communicated to a network coupled to network interface 118.

Although the approaches described above may require that host system 98 traffic and management controller 112 management traffic be routed to and from the same physical external network, host system 98 traffic and management controller 112 management traffic may be logically segregated on separate virtual networks (e.g., virtual local area networks).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system processor; and
   a management controller communicatively coupled to the host system processor and configured to provide management of the information handling system via management traffic communicated between the management controller and a network external to the information handling system, the management controller further configured to:
   couple to the external network via a first network interface integral to the management controller;
   emulate a second network interface to an operating system executing on the host system processor; and
   bridge the first network interface and the second network interface such that host system traffic may be communicated between the host system processor and the external network via the management controller,
   wherein bridging the first network interface and the second network interface comprises:
   communicating host system traffic via a dummy network interface of the management controller, the dummy network interface having a dummy network address different from a network address for management traffic associated with the management controller; and
   translating between the dummy network address and a host system network address associated with the operating system using an address translation table integral to the management controller,
   wherein the management traffic and the host system traffic are communicated via different virtual networks of the external network.

2. The information handling system of claim 1, wherein the management controller is further configured to bridge the first network interface and the second network interface at a data link layer of a network communications suite.

3. The information handling system of claim 1, wherein the management controller is further configured to monitor the host system traffic.

4. The information handling system of claim 3, wherein the management controller is further configured to control flow of the host system traffic and the management traffic based on monitoring the host system traffic.

5. The information handling system of claim 3, wherein the management controller is further configured to restrict the host system traffic based on monitoring the host system traffic.

6. A method comprising, in a management controller communicatively coupled to a host system processor and configured to provide management of the information handling system via management traffic communicated between the management controller and a network external to an information handling system housing the management controller and the host system processor:
   coupling to the external network via a first network interface integral to the management controller;
   emulating a second network interface to an operating system executing on the host system processor; and
   bridging the first network interface and the second network interface such that host system traffic may be communicated between the host system processor and the external network via the management controller,
   wherein bridging the first network interface and the second network interface comprises:

communicating host system traffic via a dummy network interface of the management controller, the dummy network interface having a dummy network address different from a network address for management traffic associated with the management controller;

translating between the dummy network address and a host system network address associated with the operating system using an address translation table integral to the management controller; and communicating the management traffic and the host system traffic via different virtual networks of the external network.

7. The method of claim 6, further comprising bridging the first network interface and the second network interface at a data link layer of a network communications suite.

8. The method of claim 6, further comprising monitoring the host system traffic.

9. The method of claim 8, further comprising controlling flow of the host system traffic and the management traffic based on monitoring the host system traffic.

10. The method of claim 8, further comprising restricting the host system traffic based on monitoring the host system traffic.

11. An article of manufacture comprising:

a non-transitory computer-readable medium; and computer-executable instructions carried on the computer-readable medium, the instructions readable by a processor, the instructions, when read and executed, for causing the processor to, in a management controller communicatively coupled to a host system processor and configured to provide management of the information handling system via management traffic communicated between the management controller and a network external to an information handling system housing the management controller and the host system processor:

couple to the external network via a first network interface integral to the management controller;

emulate a second network interface to an operating system executing on the host system processor; and bridge the first network interface and the second network interface such that host system traffic may be communicated between the host system processor and the external network via the management controller, wherein bridging the first network interface and the second network interface comprises:

communicating host system traffic via a dummy network interface of the management controller, the dummy network interface having a dummy network address different from a network address for management traffic associated with the management controller; and translating between the dummy network address and a host system network address associated with the operating system using an address translation table integral to the management controller; and communicating the management traffic and the host system traffic via different virtual networks of the external network.

12. The article of claim 11, the instructions for further causing the processor to bridge the first network interface and the second network interface at a data link layer of a network communications suite.

13. The article of claim 11, the instructions for further causing the processor to monitor the host system traffic.

14. The article of claim 13, the instructions for further causing the processor to control flow of the host system traffic and the management traffic based on monitoring the host system traffic.

15. The article of claim 13, the instructions for further causing the processor to restrict the host system traffic based on monitoring the host system traffic.

* * * * *

UNITED STATES PATENT AND TRADEMARK OFFICE
CERTIFICATE OF CORRECTION

PATENT NO. : 10,075,398 B2
APPLICATION NO. : 14/757625
DATED : September 11, 2018
INVENTOR(S) : Ballard et al.

Page 1 of 1

It is certified that error appears in the above-identified patent and that said Letters Patent is hereby corrected as shown below:

In the Specification

Column 1, Line 29, delete "may, be" and insert -- may be --, therefor.

Column 6, Line 6, delete "to allows" and insert -- to allow --, therefor.

Column 6, Line 37, delete "FIG. 1i" and insert -- FIG. 1, --, therefor.

Column 7, Line 26, delete "an dummy" and insert -- a dummy --, therefor.

Signed and Sealed this
Twenty-first Day of May, 2019

Andrei Iancu
*Director of the United States Patent and Trademark Office*